US009229911B1

(12) United States Patent
Goodwin et al.

(10) Patent No.: US 9,229,911 B1
(45) Date of Patent: Jan. 5, 2016

(54) DETECTING CONTINUATION OF FLOW OF A PAGE

(75) Inventors: Robert L. Goodwin, Mercer Island, WA (US); C. Brandon Forehand, Seattle, WA (US); Keith L. Frost, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1311 days.

(21) Appl. No.: 12/241,321

(22) Filed: Sep. 30, 2008

(51) Int. Cl.
*G06F 17/21* (2006.01)

(52) U.S. Cl.
CPC ..................................... *G06F 17/21* (2013.01)

(58) Field of Classification Search
CPC ..... G06F 17/211; G06F 17/217; G06F 17/21; G06K 9/00442; G06K 9/00469
USPC ......... 715/243, 244, 247, 251, 255, 256, 258, 715/272
See application file for complete search history.

(56) References Cited

U.S. PATENT DOCUMENTS

| | | | |
|---|---|---|---|
| 4,741,045 A | 4/1988 | Denning | |
| 5,029,107 A | 7/1991 | Lee | |
| 5,164,899 A * | 11/1992 | Sobotka et al. | 704/9 |
| 5,179,650 A * | 1/1993 | Fukui et al. | 715/209 |
| 5,285,526 A | 2/1994 | Bennett et al. | |
| 5,335,290 A * | 8/1994 | Cullen et al. | 382/176 |
| 5,465,304 A | 11/1995 | Cullen et al. | |
| 5,590,257 A | 12/1996 | Forcier | |
| 5,671,438 A | 9/1997 | Capps et al. | |
| 5,689,342 A * | 11/1997 | Nakatsuka | 358/296 |
| 5,774,580 A | 6/1998 | Saitoh | |
| 5,778,103 A | 7/1998 | Allan et al. | |
| 5,784,487 A | 7/1998 | Cooperman | |
| 5,802,533 A * | 9/1998 | Walker | 715/201 |
| 5,848,184 A * | 12/1998 | Taylor et al. | 382/173 |
| 5,850,490 A | 12/1998 | Johnson | |
| 5,860,074 A | 1/1999 | Rowe et al. | |
| 5,907,631 A | 5/1999 | Saitoh | |

(Continued)

FOREIGN PATENT DOCUMENTS

| | | |
|---|---|---|
| EP | 1343095 A2 | 9/2003 |
| JP | 07-192084 A | 7/1995 |

(Continued)

OTHER PUBLICATIONS

Thomas M. Breuel et al, "Reflowable Document Images", date: Nov. 18, 2002, publisher: WSPC, pp. 1-13.*

(Continued)

*Primary Examiner* — Wilson Tsui
(74) *Attorney, Agent, or Firm* — Knobbe, Martens, Olson & Bear, LLP

(57) ABSTRACT

A flow of objects, such as text, on a page may be analyzed by generating an initial determination of whether a portion of an object is continued from one page to another based on a cue in an area of the object. The initial determination may be visually represented on a page. The initial determination may be corrected by an editor to create an editor determination when the initial determination is not a correct continuation status of the portion of the object. In some aspects, the initial determination may include a statistical confidence interval, a reason display, and/or a magnification of portions of the object which may be included in a continuation. In other aspects, heuristics may learn from the editor changes to improve a subsequent initial determination.

24 Claims, 9 Drawing Sheets

(56) References Cited

U.S. PATENT DOCUMENTS

| | | | |
|---|---|---|---|
| 5,933,531 A * | 8/1999 | Lorie | 382/229 |
| 5,978,819 A | 11/1999 | Berstis | |
| 6,002,798 A | 12/1999 | Palmer et al. | |
| 6,032,163 A | 2/2000 | Tou et al. | |
| 6,256,610 B1 | 7/2001 | Baum | |
| 6,269,188 B1 * | 7/2001 | Jamali | 382/229 |
| 6,298,357 B1 | 10/2001 | Wexler et al. | |
| 6,377,704 B1 | 4/2002 | Cooperman | |
| 6,487,570 B1 | 11/2002 | Forcier | |
| 6,510,243 B1 | 1/2003 | Ikeda | |
| 6,562,077 B2 | 5/2003 | Bobrow et al. | |
| 6,766,495 B1 | 7/2004 | Bates et al. | |
| 6,915,484 B1 | 7/2005 | Ayers et al. | |
| 6,956,587 B1 | 10/2005 | Anson | |
| 6,978,046 B2 | 12/2005 | Robinson et al. | |
| 7,171,061 B2 | 1/2007 | Sarkar et al. | |
| 7,213,035 B2 | 5/2007 | Ornstein et al. | |
| 7,219,309 B2 | 5/2007 | Kaasila et al. | |
| 7,272,258 B2 | 9/2007 | Berkner et al. | |
| 7,362,311 B2 | 4/2008 | Filner et al. | |
| 7,392,472 B2 | 6/2008 | Simard et al. | |
| 7,412,647 B2 | 8/2008 | Sellers et al. | |
| 7,433,548 B2 | 10/2008 | Goodwin et al. | |
| 7,460,710 B2 | 12/2008 | Coath et al. | |
| 7,469,388 B1 | 12/2008 | Baudisch et al. | |
| 7,486,628 B1 | 2/2009 | Brisebois et al. | |
| 7,630,968 B2 * | 12/2009 | McCammon et al. | |
| 7,870,503 B1 | 1/2011 | Levy et al. | |
| 7,899,249 B2 * | 3/2011 | Furmaniak et al. | 382/176 |
| 7,930,634 B2 * | 4/2011 | Nakamura | 715/273 |
| 2002/0052898 A1 | 5/2002 | Schlit et al. | |
| 2002/0191847 A1 | 12/2002 | Newman et al. | |
| 2003/0014445 A1 | 1/2003 | Formanek et al. | |
| 2003/0126558 A1 | 7/2003 | Griffin | |
| 2003/0128234 A1 | 7/2003 | Brown et al. | |
| 2003/0135649 A1 | 7/2003 | Buckley et al. | |
| 2003/0231219 A1 | 12/2003 | Leung | |
| 2004/0004641 A1 | 1/2004 | Gargi | |
| 2004/0006742 A1 * | 1/2004 | Slocombe | 715/513 |
| 2004/0101198 A1 * | 5/2004 | Barbara | 382/181 |
| 2004/0103371 A1 | 5/2004 | Chen et al. | |
| 2004/0139384 A1 | 7/2004 | Lin | |
| 2004/0146199 A1 | 7/2004 | Berkner et al. | |
| 2004/0202352 A1 | 10/2004 | Jones | |
| 2004/0205568 A1 | 10/2004 | Breuel et al. | |
| 2005/0116954 A1 * | 6/2005 | Ripps et al. | 345/440 |
| 2005/0125549 A1 | 6/2005 | Katayama | |
| 2005/0128516 A1 | 6/2005 | Tomita | |
| 2005/0195221 A1 * | 9/2005 | Berger et al. | 345/660 |
| 2005/0234893 A1 | 10/2005 | Hirsch | |
| 2006/0005116 A1 | 1/2006 | Ferguson et al. | |
| 2006/0080309 A1 * | 4/2006 | Yacoub et al. | 707/4 |
| 2006/0181742 A1 | 8/2006 | Lech et al. | |
| 2006/0227153 A1 | 10/2006 | Anwar et al. | |
| 2006/0282838 A1 | 12/2006 | Gupta et al. | |
| 2006/0288278 A1 | 12/2006 | Kobayashi | |
| 2006/0288279 A1 | 12/2006 | Yacoub et al. | |
| 2007/0061704 A1 | 3/2007 | Simova et al. | |
| 2007/0112810 A1 | 5/2007 | Johnson | |
| 2007/0234203 A1 | 10/2007 | Shagam et al. | |
| 2008/0267535 A1 | 10/2008 | Goodwin et al. | |

FOREIGN PATENT DOCUMENTS

| | | |
|---|---|---|
| JP | 2004005453 A | 1/2004 |
| JP | 2004532430 T | 10/2004 |
| WO | WO 02/089105 A2 | 11/2002 |

OTHER PUBLICATIONS

Boychuk, B., Shortcovers for iPhone Review, Macworld.com, http://www.macworld.com/article/141540/2009/07/shortcovers.html, Jul. 6, 2009, pp. 3.

Breuel, T.M., et al., Reflowable Document Image, Chapter 1, pp. 1-14, (http://citeseerx.ist.psu.edu/viewdoc/download?doi=10.1.1.12.9828&rep=rep1&type=pdf) [retrieved on Nov. 17, 2010], Nov. 18, 2002.

Cattoni, R., et al., Geometric Layout Analysis Techniques for Document Image Understanding: A Review, Retrieved from the Internet: URL:http://tev.itc.it/people/modena/Papers/DOC_SEGstate.pdf retrieved on Jan. 29, 2003, 1998.

Lin, X., Header and Footer Extraction by Page-Association, Hewlett-Packard Company, May 6, 2002, pp. 1-8, Palo Alto, California, U.S.

Montanés, E., et al., Towards Automatic and Optimal Filtering Levels for Feature Selection in Text Categorization, Advances in Intelligent Data Analysis VI, Sep. 2005, pp. 239-248.

PDF Reference Fifth Edition, Adobe Portable Document Format Version 1.6, Chapter 5.9, Adobe Systems Incorporated, 1985-2004, pp. 440-446.

Taghva et al., The Impact of Running Headers and Footers on Proximity Searching, Information Science Research Institute, University of Nevada, 2004, pp. 5, Las Vegas, Nevada, U.S.

Malerba, et al., Correcting the Document Layout: A Machine Learning Approach,, Proceedings of the Seventh International Conference on Document Analysis and Recognition, IEEE 2003, p. 6.

* cited by examiner

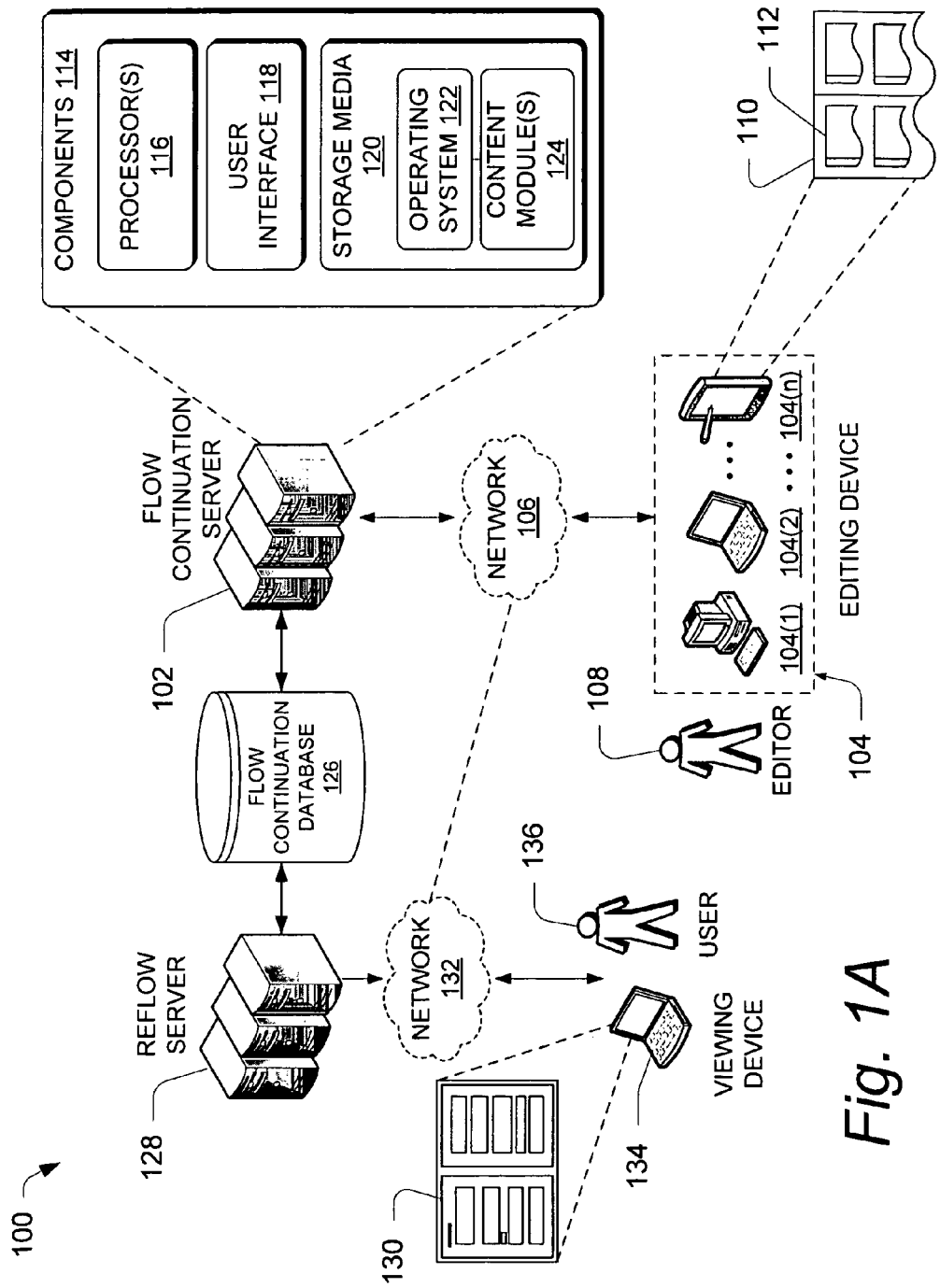

Fig. 4

DETECTING CONTINUATION OF FLOW OF A PAGE

BACKGROUND

Content is increasingly being distributed in electronic form to an array of users for use on computing devices. Content may include traditional media such as books, magazines, newspapers, newsletters, manuals, guides, references, articles, reports, documents, etc. The content may initially exist in print and/or in electronic form, and in the case of the print form, may be transformed from print to an electronic form through the use of an imaging device. Additionally, as more content is transformed from print to electronic form, more digital images of content are becoming available. In some instances, electronic content may be formatted to replicate a page of content as it appeared or would appear in print.

Content that is transformed from print to electronic form often includes formatting which is difficult or impossible to detect even by complex computer algorithms. For example, content may include an intended or correct association of sections or symbols, which may seem obvious or intuitive to a human reader, but which are unable to be consistently detected by an algorithm. For example, text that continues from a first page to a second page may have intended correct association (e.g., a continuation of a paragraph) which is not easily detectable by a computer algorithm.

In some instances, human editors may be needed to assist in formatting content during the transformation from print to electronic form. For example, a human editor may review each page of a scanned book to verify an assigned format, which may be a time consuming and tedious editing process. However, it is desirable to minimize human interaction during an editing process to increase efficiency while maximizing accuracy of a formatting process.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 1A shows an illustrative computing environment in which one or more embodiments of detecting a continuation of flow of content from one page to another may be implemented.

FIG. 4 shows an illustrative interface for displaying pages in which the flow of content continues from one page to another and for providing information regarding the flow of content.

DETAILED DESCRIPTION

Overview

Figure 1B:
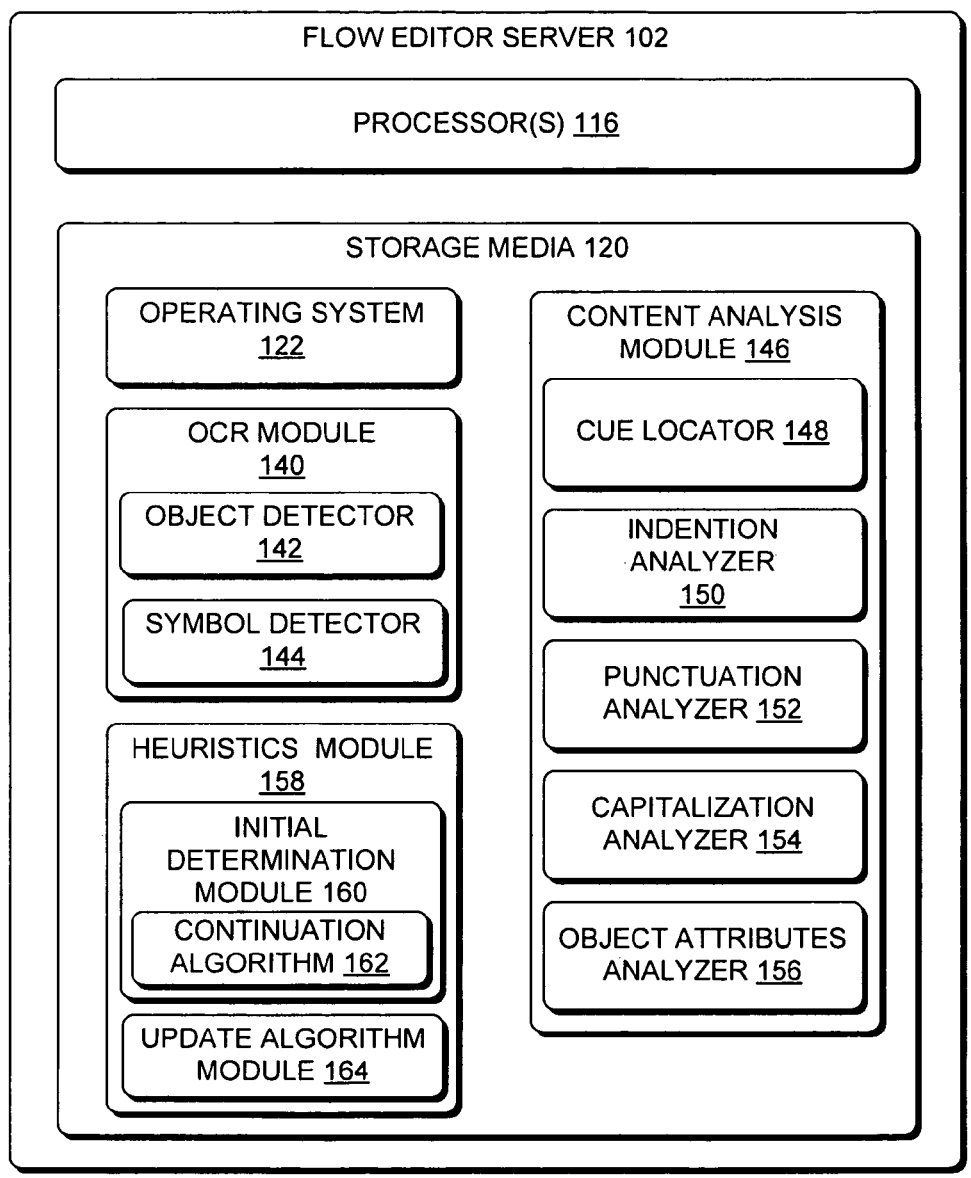
FIG. 1B is a block diagram illustrating one or more embodiments of modules associated with a flow continuation server of the computing environment of FIG. 1A.

The disclosure is directed to detecting a continuation of flow of content from one page to another. As used herein, a page is a grouping of content, such as a single column of text, that may be continued to a second grouping of content (e.g., a second column, new page, etc.). The page may reside on one or more image-based files that contain one or more letters, characters, symbols, numbers, formulas, graphics, line drawings, table borders, images, textual content, or other objects, that may be used to represent information in a page. For example, the object may be a paragraph of text, which continues from a first location to a second location, and which is separated by an intervening feature such as a page break, column break, image, or other intervening feature.

A process of modifying an image-based file for presentation may include various operations. In one or more embodiments, an optical character recognition (OCR) device may be used to create or modify the image-based file. The OCR may be used to identify objects as zones of a page in addition to or instead of identifying specific characters, etc., as is typically done for an image-to-text conversion. Computer implemented algorithms and human editors may manipulate the image-based file such that the file may be represented on a second medium in a manner consistent with an original representation. For example, a page of a book may be scanned by an OCR device to create the image-based file, which may then be edited by human editors and computer algorithms to produce a reflowable image-based file for viewing on a display device. Reflowing may permit lines of objects to vary in presentation by modifying a line, a column, and/or a page distribution for an object in a "reflow" according to the given dimensions and limitations of a selected output medium, such as the size of a display or window. The image-based file can be configured to automatically adapt itself via reflowing to be rendered on various output media, such as various sized displays and windows on electronic media and/or printed media.

Generally speaking, flow continuation detection techniques disclosed herein may enable presentation of the image-based file including objects of content, such as paragraphs of text, while preserving an intended continuation of flow of the content from the original presentation, such as the printed version in a scanned document. For example, the image-based file may contain a portion of an object having content that is continued by another portion of the object (having the remaining content) on a different page. When a page break, column break, image, or other interruption of content is removed or modified (e.g., extending page height to increase content space, etc.) objects that were discontinuous may be rejoined in a presentation as complete objects. Objects may be interrupted at various points, such as in the middle of a sentence or between sentences. A reflowable image-based file may be created to store object continuation information as selected during a flow continuation detecting process to enable proper display of objects despite a presentation display size or format constraints of a document that are different from the original presentation of the document. The term "document" may include electronic and/or fixed medium collections of content, such as text, and may be compiled as a book, magazine, advertisement, newspaper, newsletter, manual, guide, reference, article, report, or any other communication medium for exchanging messages using visual means.

For purposes of discussion, detecting a continuation of flow of content from one page to another is described in the context of detecting a continuation of flow of pages of paragraphs of text in an image-based file. One illustrative implementation of this context is provided below. However, the described flow continuation detection techniques may be implemented in other contexts. Moreover, other flow continuation detection techniques may be performed by the illustrated architecture or other architectures.

Illustrative System Architecture

FIG. 1A shows an illustrative computing environment 100 usable in detecting a continuation of flow of a page. The environment 100 includes a flow continuation server 102 and an editing device 104 communicatively connected by a network 106. The editing device 104 may receive input from an editor 108. For example, the editor 108 may be a human editor capable of editing a page 100 using the editing device 104. The page 100 may be a portion of an image-based file, a single image-based file, or may be partitioned across multiple image based files. In one or more embodiments, the editing device 104 may be configured to receive the page 110 from the flow continuation server 102 via the network 106, and to render the page 110 on an output device, such as a display screen. The page 110 includes objects 112, such as paragraphs of text, headers, sidebars, or other collections of characters, symbols, etc.

The editing device 104 may comprise any number of possible editing devices 104(1), 104(2), . . . , 104(n). For example, the editing device 104(1) may be a desktop computer and the editing device 104(2) may be a portable computer, each having respective user control devices such as a touchpad, mouse, track ball, keyboard, voice recognition commands, and the like. In some embodiments, the editing device 104(n) may be a touch screen-enabled device (e.g., a tablet computer, personal data assistant (PDA), electronic book reader device, etc.) which enables the editor 108 to input data by touching a display. For example, the editor 108 may input data by touching the display of the editing device 104(n) with the editor's finger, a stylus, or other input device. A touch screen may enable the editor 108 to intuitively interact with the editing device 104(n) with minimal training, thus reducing the learning time associated with operation of the editing device. In other embodiments, the editing device 104 may be a specialized computing device for detecting a continuation of flow of a page. For example, the specialized computing device may only include limited controls which are necessary for the editor 108 to perform any necessary functions.

In accordance with one or more embodiments, the editing device 104 may include a browser or other user interface which enables the editor 108 to interact with the flow continuation server 102 via a web-based application. In this configuration, the editing device 104 may not require customized software (e.g., modules, applications, etc.), but instead may access modules from the flow continuation server 102 via the network 106. In additional embodiments, the editing device 104 may include local versions of the modules included in the flow continuation server 102, as described below.

The network 106 in FIG. 1A may be a local area network ("LAN"), a larger network such as a wide area network ("WAN"), or a collection of networks, such as the Internet. Protocols for network communication, such as TCP/IP, are well known to those skilled in the art of computer networks and may be used to implement the network connections described herein. Persons of ordinary skill in the art will recognize that the systems and methods disclosed herein may also be used in other interactive environments, such as local or wide area networks that connect servers storing related documents and associated files, scripts, and databases, or broadcast communication networks that include set-top boxes or other information appliances providing access to audio or video files, documents, scripts, databases, etc. Although embodiments are described herein as using a network such as the Internet, other distribution means are contemplated that transmit information via memory cards, flash memory, or other portable memory devices.

In accordance with one or more embodiments, the flow continuation server 102 may include a number of components 114 for detecting continuation of flow of a page. The flow continuation server 102 may include greater or fewer components than those shown in FIG. 1A. The components 114 include one or more processors 116, a user interface (UI) 118, and storage media 120, all communicatively connected to each other. The UI 118 represents any devices and related drivers that enable the flow continuation server 102 to receive input from a user (e.g., the editor 108) or other systems, and to provide output to the user or the other systems. Thus, to receive inputs, the UI 118 may include keyboards or keypads, mouse devices, touch screens, microphones, speech recognition packages, imaging systems, or the like. Similarly, to provide outputs, the UI 118 may include speakers, display screens, printing mechanisms, or the like.

The flow continuation server 102 may include one or more instances of a computer-readable storage media 120 that are addressable by the processor 116. As such, the processor 116 may read data or executable instructions from, or store data to, the storage media 120. The storage media 120 may contain an operating system 122 and one or more content modules 124, which may be implemented as one or more software modules that, when loaded into the processor 116 and executed, cause the flow continuation server 102 to perform any of the functions described herein, such as to enable detecting a continuation of flow of a page in accordance with embodiments of the present disclosure. Additionally, the storage media 120 may contain implementations of any of the various software modules described herein.

In accordance with an embodiment, the flow continuation server 102 is communicatively coupled to a flow continuation database 126. The flow continuation server 102 may communicate or otherwise provide flow continuation data to a reflow server 128 via a network and/or the flow continuation database 126. In some embodiments, the flow continuation server 102 may store the flow continuation data in the flow continuation database 126. The reflow server 128 retrieves the flow continuation data and incorporates it in a reflowable image-based file 130 which is transmitted via a network 132 to a viewing device 134 for display to a user 136. Alternatively or additionally, the reflowable image-based file 130 may be stored on a portable or fixed storage device (e.g., a hard disk, flash memory, etc.) for retrieval by the viewing device 134. The network 132 may be similar to the network 106 which is described above. In an example, the viewing device 134 may be an e-book reader, web-enabled device, etc., and may render the reflowable image-based file 130 on a display for viewing by a user 136.

FIG. 1B is a block diagram illustrating one or more embodiments of modules 138 associated with the flow continuation server 102 of FIG. 1A. As discussed above, the flow continuation server 102 includes the processors 116 and storage media 120, which includes the operating system 122 in addition to other content modules. In accordance with embodiments, the storage media 120 includes an optical character recognition (OCR) module 140 which may include an object detector 142 and a symbol detector 144. The object detector 142 may enable identification of objects of a page. For example, the object detector 142 may detect a paragraph of text, or a portion of a paragraph of text that has content that is continued in another portion of the paragraph. The symbol detector 806 may enable identifying specific characters (e.g., letters, punctuation, etc.), character attributes (e.g., capitalization, non-capitalization, blank lines, etc.) to enable an image-to-text conversion. In some embodiments, the object detector 142 may detect an object of a page, which may then be designated by the editor 108 as being a complete object or as being a portion of an object that is continued at another location, such as another page.

In some embodiments, the storage media 120 may include a content analysis module 146. The content analysis module 146 may enable analysis of various aspects of a page, object, and content, as described herein, to determine a continuation of flow of content from one page to another. The content analysis module 146 may include a plurality of individual components such as a cue locator 148, an indention analyzer 150, a punctuation analyzer 152, a capitalization analyzer 154, and an object attributes analyzer 156.

The cue locator 148 may be used to locate cues on the page. The cues may be attributes of the objects or page that may assist a reader in determining whether an object is continued at another location. The cues may be language usage, punctuation, context, font, and so forth. The cue locator 148 may locate each object that may have a continuation, such as object at the end of a page, at the end of a column, at the end of a section, before a float (e.g., an image, table, equation, etc.), or in other locations. The cue locator 148 may then determine a specific portion of the located object that requires additional analysis. For example, a cue may be located at the upper left corner of a block of content on a second page, where the cue is an indention. The indention, or lack thereof, may be used to determine if the block of text is a continuation of an object that is at least partially located on a previous page.

In some embodiments, the indention analyzer 150 may determine if an object or cue includes an indention. For example, the cue located by the cue locator 148 may be analyzed to determine if an indention is included in the upper left portion of an object. In addition, other objects may be analyzed by the indention analyzer 812 to determine whether a document generally includes indentions, such as by randomly or methodically analyzing objects in the document to determine whether indentions are used in the document. More specifically, if indentions are consistently used in a document, then the lack of an indention in a block of text (i.e., portion of an object) may indicate that the object is continued from another portion of the object that is located on a preceding page.

The punctuation analyzer 152 may determine if a cue includes punctuation. For example, the last character in the lower right portion of an object (i.e., the cue in this example) may be identified by the symbol detector 144. The punctuation analyzer 152 may then analyze the cue, such as by employing a statistical analysis (e.g., a confidence interval, etc.) to determine if the cue indicates a continuation of text from one page to another page. For example, if the cue is a hyphen at the end of an object located on the first page, then the cue may include a strong indication that the block of text is a portion of an object that is continued on a second page.

The capitalization analyzer 154 may determine if a cue includes a capitalization of text. For example, the first character in the upper left portion of an object (i.e., the cue in this example) may be identified by the symbol detector 144. The capitalization analyzer 154 may then analyze the cue, such as employing a statistical analysis to determine if the cue indicates a continuation of text from one page to another page. For example, if the cue is a capitalized word in a block of text located at the top of a second page, then the block of text may be an object. However, in some instances, the block of text may also be a portion of an object where the object is continued to a second page at a sentence break (i.e., the first portion ends with a punctuation such as a period, etc.).

In accordance with one or more embodiments, the object attributes analyzer 156 may analyze one or more attributes of objects (i.e., various cues), such as employing a statistical analysis to determine if the cue indicates a continuation of text from one page to another page. For example, the object attributes analyzer 156 may determine the number of words, characters, lines of characters, or location of lines or blank spaces in an object, which may assist in determining a continuation status of objects of a page. In addition or alternatively, the object attributes analyzer 156 may analyze grammar of at least a portion of an object to determine whether the object is continued from one location to another.

In accordance with one or more embodiments, the storage media 120 may include a heuristic module 158, which may include an initial determination module 160, a continuation algorithm 162, and an update algorithm module 164. The initial determination module 160 may create an initial determination, via the continuation algorithm 162, and display the initial determination to the editor 108, among other possible operations. The initial determination is an object continuation status of whether a block of text is a portion of an objected that is continued on a second page or a complete object having no continuation of content on another page. The continuation algorithm 162 may use information from one or more of the cue locator 148, the indention analyzer 150, the punctuation analyzer 152, the capitalization analyzer 154, and an object attributes analyzer 156 to generate the initial determination.

In some embodiments, the initial determination module 160 may "learn" by employing advanced heuristics that analyze input from the editor 108 to improve the initial determination. The initial determination module 160 may receive data, updates, or configurations from the update algorithm module 164 to improve the continuation algorithm 162. For example, when the editor 108 corrects (e.g., rejects, etc.) the initial determination, the update algorithm module 164 may recognize a pattern in the document, which in turn may prompt an adjustment to the continuation algorithm. For example, the editor 108 may continually designate a first object as not a continuation of a second object when the first object appears to be a header. However, the initial determination module 160 may incorrectly designated the first object as a continued object until the update algorithm module 164 detects this pattern of changes by the editor 108 and updates the continuation algorithm 162 accordingly. In one or more embodiments, the heuristics may perform a statistical analysis of editing trends to match cues with particular editing patterns received from an editor, and thus improve an accuracy of the initial determination module 160 based on editing trends. In some instances, the editing patterns may be analyzed on a continual basis in association with an execution of the initial determination module 160, while in some instances the editing patterns may be analyzed on an ad hoc basis. In some embodiments, the update algorithm module 164 may only update the continuation algorithm 162 for a given project, such as editing the continuation of flow of objects of a book or other document.

Illustrative Continuation of Flow Determination

Figure 2:
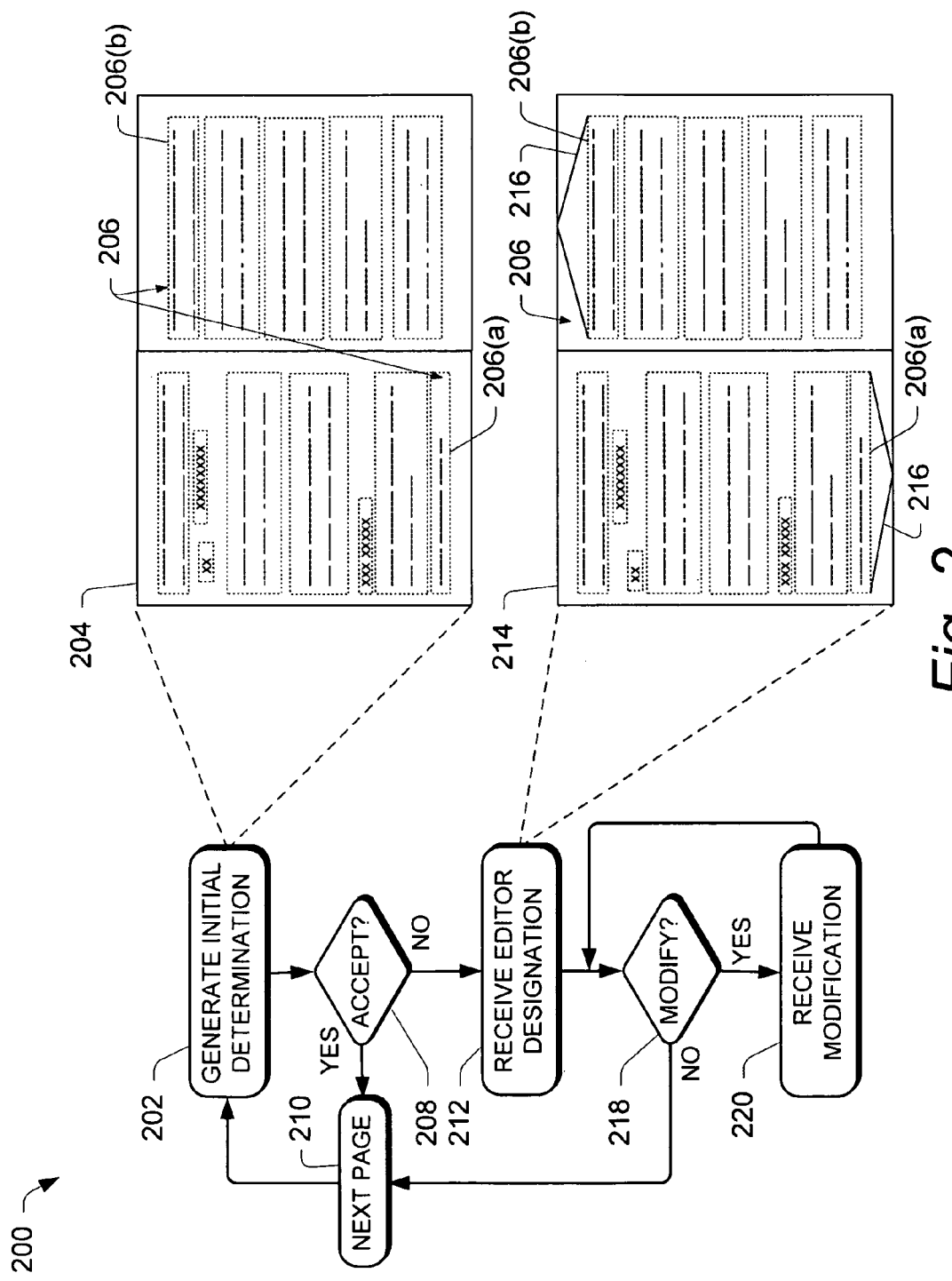
FIG. 2 is a flow diagram of an illustrative process of detecting continuation of flow of content from one page to another in accordance with one or more embodiments of the disclosure.

FIG. 2 is a flow diagram of an illustrative process 200 of detecting continuation of flow of a page in accordance with one or more embodiments of the disclosure. The process 200 is illustrated as a collection of blocks in a logical flow graph, which represents a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the process 200 is described with reference to the environment 100 of FIG. 1A.

The process 200 may begin, at 202, with an initial determination 204 of the flow of one or more objects from one page to another. The initial determination 204 may be generated by the initial determination module 160. For example, an object 206 may be separated into a first portion 206(*a*) and a second portion 206(*b*) because of an intervening page break, column break, image, or for other formatting reasons. The initial determination 204 at 202 may enable identification of a continued object (e.g., the object 206) and may enable a representation of the object in a second medium (e.g., on an electronic book reader, etc.) without the separation. In some embodiments, the initial determination 204 may be graphically represented on a page, thus enabling the editor 108 to quickly determine if the continuation designation of objects in the initial determination 204 is correct.

In some embodiments, one or more attributes of objects of a page may be analyzed at 202 by the initial determination module 160 to generate the initial determination 204. However, other techniques may be used at 202 to generate the initial determination 204. For example, heuristics may be employed by the heuristics module 158. The heuristics may update the continuation algorithm, such as by using historical editor input to adjust the algorithm to reflect editing trends that are received from the editor. In some embodiments, the update algorithm module 164 may update the continuation algorithm to improve the accuracy of the heuristics based on input by the editor 108, such that the heuristics "learn" after a predetermined amount of editor input.

The initial determination 204 may result in ambiguous information without benefit of other factors which are not readily accessible (or capable of evaluation). For example, a block of text that ends with a period on a first page may generate the initial determination 204 as not including a continuation of the object on another page, despite a chance that a sentence in the block of text may end at a page break and the object does continue to another page. Factors such as language usage, punctuation, context, font, or other cues may assist a reader in determining whether an object is continued at another location, and thus help identify the object continuation status despite ambiguity. When viewed only as objects without the benefit of content and/or context, an incorrect initial determination 204 may be generated at 202. Even with the benefit of content and/or context, the initial determination 204 may not always accurately reflect an intended object continuation status. For example, the initial determination 204 may result in a false positive when it is incorrectly determined at 202 that an object is continued at a second location or the initial determination 204 may result in a false negative when it is incorrectly determined at 202 that the object is not continued at a second location.

At 208, the content module(s) 124 may receive an editor designation from the editor 108. For example, the editor 108 may accept the initial determination 204 if it correctly represents an intended continuation of an object from one page to another. In some embodiments, the content module(s) 124 may enable the editor 108 to select a "next" command, at 210, which may result in the flow continuation server 102 serving up additional pages to be analyzed by the editor. Alternatively, the content module(s) 124 may enable the editor 108 to designate the initial determination 204 as incorrectly representing the continuation of an object from one page to another.

In that case, at 212, content module(s) may enable the editor 108 to edit the initial determination 204 and generate an editor designation 214 of objects from one page to another. The editor 108 may edit the initial determination 204 by controlling input devices configured with the editing device 104. For example, the editor 108 may use a mouse, stylus, his or her finger, a voice command, or other inputs to edit the designation of objects as being continued from one page to another using the benefit of human recognizable cues on the pages. At 212, the content module(s) 124 may enable the editor to consecutively select the first portion 206(*a*) and the second portion 206(*b*) of the object 206 to designate the portions as being continued from one page to another via user input when the initial determination 204 is a false negative that is provided at the operation 202. In some embodiments, the content module(s) 124 may enable the editor 108 to use a menu on a user interface to selectively designate the second portion 206(*b*) of an object as being continued of the first portion 206(*a*) of the object 206. Alternatively, the editor may designate the second portion 206(*b*) as not being continued from the first portion 206(*a*) (e.g., using the menu, etc.) when the initial determination 104 is a false positive. As a result, the object 206 is designated as either being continued at a second location, or conversely, not continued at a second location. This designation enables reflowing the object(s) with the proper breaks (page, column, paragraph, etc.) when the content of a document is reformatted, such as when it is displayed on a second medium (e.g., a computer display).

In some embodiments, the editor designation 214 and/or the initial determination 204 may include a visual guide 216 to indicate the object 206 is continued at a second location. The visual guide 216 may provide user information to assist the editor 108 in determining whether the object 206 is designated as being continued from another page. For example, the visual guide 216 may not be generated by the content module(s) 124 when the object 206 is not continued from one page to another. The visual guide 206 may include one or more of shapes, color coding, animation, or other visual guides, which may be interpreted by the editor 108 to indicate whether the object is continued from one page to another. In further embodiments, an audible guide may be used in addition to, or alternative to, the visual guide 216.

In accordance with some embodiments, at 218, the content module(s) may enable the editor 108 to choose to accept the editor designation 214 or to modify the editor designation. If the editor accepts the editor designation 214 (e.g., selects a continue command, pauses for a predetermined period, etc.), the flow continuation server 102 may serve another page at the operation 210. If the editor decides to modify the editor designation 214, the editor may make a modification at 220. The modification may be received by the content modules(s) 124 when the editor consecutively selecting objects or by other user selection techniques. After the modification at 220, an updated editor designation 214 may be represented by the flow continuation server 102 and accordingly presented to the editor. The editor may again modify the editor designation 214, by repeating the operations 218 and 220 as necessary. When the modifications are complete, the flow continuation server 102 may serve another page at the operation 210.

In accordance with one or more embodiments, the content module(s) 124 may not make an initial determination 204 at 202. Accordingly, the content module(s) 124 may begin at 212 by enabling the editor 108 to designate the editor designation 214. For example, the initial determination module 160 not provide a confidence interval from the continuation algorithm 162 that is great enough for the flow continuation server 102 to create the initial determination 204, such as when the objects of a page include ambiguous information. In other embodiments, the flow continuation server 102 may default to designating an object as being continued from one page to another, or vice versa, and thus begin at 202 of the process 200.

Figure 3:
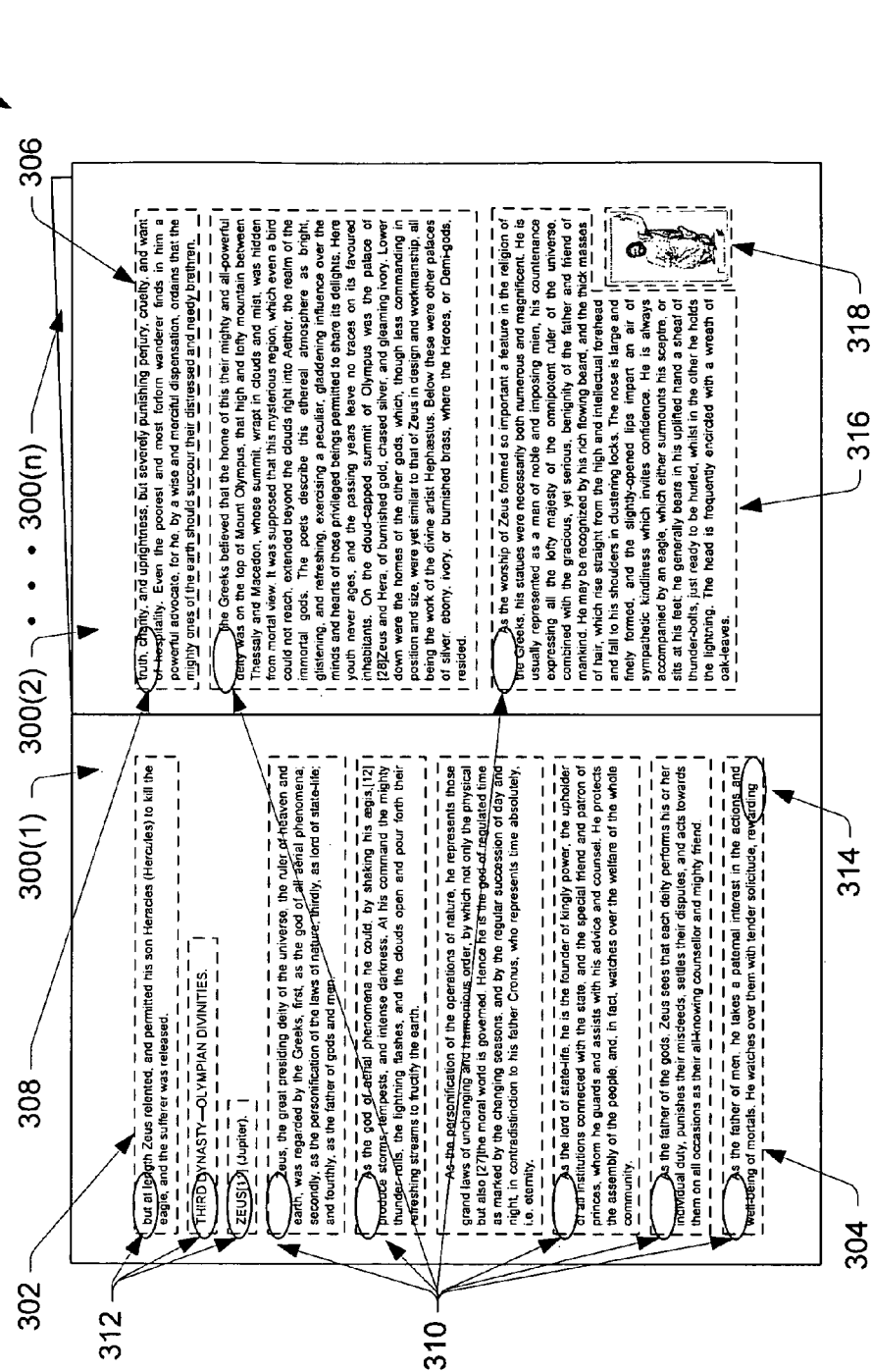
FIG. 3 shows illustrative pages in which the flow of content continues from one page to another, the pages including one or more continuation attributes in accordance some embodiments of the disclosure.

FIG. 3 shows a plurality of illustrative pages 300(1)-300(n) in which content flows from one page to another. For example, a number of pages may be included in a document, such as a current page 300(1), a next page 300(2), and a last page 300(n), among other possible pages in the document. Each page may include one or more cues, which may be located by the cue locator 148 and analyzed by other modules in the content analysis module 146 in accordance some embodiments of the disclosure. In some embodiments, one or more pages may include columns, where each column may be treated similar to a page, where objects may continue from a position on a first column to a position on a subsequent column (e.g., through a column break).

Each of the pages 300 may include a plurality of objects 302. For example, an object may be a block of text such as a header, title, paragraph, sentence, sidebar, footer, or other grouping of text, characters, symbols, etc. A first object portion 304 may be at a first location, such as at the bottom of the current page 300(1). The content of the first object portion 304 may continue into a second object portion 306 at a second location, such as at the top of the next page 300(2). In accordance with embodiments of the disclosure, an analysis of the first object portion 304 and/or the second object portion 306 may determine whether the second object portion is a continuation of the first object portion, or if they are in fact separate objects. The determination may include calculating a statistical confidence interval which represents a likelihood of the determination being the correct determination. The statistical confidence interval may be calculated for each cue, such as without limitation a cue of the first object portion 304 ending with a period may create a sixty percent (or other percentage value) likelihood that the first object portion 304 is not continued to the second object portion 306. The statistical confidence interval for each cue may be combined, such as by adding the confidence intervals or by other techniques to create a global statistical confidence interval. Thus, when the combination of statistical confidence intervals for the cues indicates that the first object portion 304 is continued to the second object portion 306 (or vice versa), a numeric value may represent a likelihood of the determination being correct.

In some embodiments, the content modules 124 of the flow continuation server 102 may use information illustrated on the pages 300 to determine whether the first object portion 304 is continued by the second object portion 306. A focus point for analysis of the second object portion 306 may be at a first cue 308, which may be located in an upper left portion (e.g., a beginning portion) of the second object portion 306. The cue locator 148 may locate the cues, such as the first cue 308. The symbol detector 142 of the OCR module 140 may be used to determine the text, spacing, or other aspects of the first cue 308. Therefore, the first cue 308 may include the initial spacing of the second object portion 306, the first letter of the second object, or other attributes of the second object.

In some embodiments, the first cue 308 may determine whether the second object portion 306 begins with an indention of text. Often, indentions of text tend to signal the start of a new paragraph to a reader. However, the occurrence of an indention at the first cue 308 may not be dispositive as to whether the second object portion 306 is a continuation of the first object portion 304. For example, the non-occurrence of an indention at the first cue 308 may be a format consistent with non-indented paragraphs is a document. Alternatively, an indention at the first cue 308 may be used for inline quotations, or other formatting, of content which continues from the first object portion 304 despite including the indention at the first cue.

To further determine whether an indention may be used to determine when content in the first object portion is continued to content in the second object portion 306, other paragraphs in the document may be analyzed by the content module(s) 124. The indention analyzer 150 may analyze indention object cues 310 to determine whether the document uses indentions to begin new paragraphs. If the determination results in a trend of using indentions for new paragraphs, the content modules 124 may include a higher statistical confidence interval for the determination being accurate, or may make a dispositive determination in some instances. Thus, the first cue's inclusion or exclusion of the indention may enable a determination of a continuation.

However, through analysis using the content analysis module 146, other paragraph cues 312 may provide inconsistent information regarding usage of indentions in a document. Therefore, the objects 302 used for the indention object cues 310 may also include the statistical confidence interval. In some embodiments, the content modules 124 may randomly select one or more objects from sections of a document to determine if objects generally include indentions. If a percentage of objects determined to include an indention is above a threshold, the content modules may predict that indentions are used in the document regardless of instances where objects do not include indention, such as titles, headers, footers, and the like.

In accordance with some embodiments, the capitalization analyzer 154 may determine that the first cue 308 includes a capitalization of the first letter of content in the second object portion 306. Capitalization at the first cue 308 may decrease a likelihood (e.g., statistical confidence interval) that the second object portion 306 is a continuation of the first object portion 304. However, capitalization is typically not dispositive of the occurrence of a continuation because a new sentence in a paragraph spanning the content of the first object portion 304 to the second object portion 306 may begin at the first cue, thus possibly creating a false negative if the occurrence of a capitalization was used to make a determination of the content not being continued from the first object portion 304 without analyzing other cues. In some embodiments, the first cue 308 may be used in combination with other cues or information to determine whether the content of the first object portion 304 is continued to the second object portion 306. For example, both the capitalization analyzer 154 and the indention analyzer 150 may be used together to create a combined statistical confidence interval of a determination of whether the content of the first object portion 304 is continued to the second object portion 306.

A focus point for analysis of the first object portion 304 may be at a second cue 314, which may be located in a lower right portion (e.g., an end portion) of the first object portion 304. Similar to the first cue 308, an inspection of the second cue 314 may include using the symbol detector 144 to determine the text, spacing, punctuation or other aspects of the first object 304. In embodiments, the symbol detector 144 may use OCR to determine the character type of the last character at the second cue 314. The character type may be a punctuation mark that indicates the end of an object portion is the end of a complete object (e.g., a paragraph), such as a period, question mark, or exclamation point. The second cue 314 may then be assigned a confidence interval to indicate a low likelihood of a continuation. However, the second cue may be a comma, hyphen, colon, semi-colon, or a lower case word that may indicate a paragraph continuation, which may be assigned a confidence interval to indicate a high likelihood of a continuation. In some embodiments, parenthesis and quotation mark placement and/or occurrence may be analyzed to determine if a hanging parenthesis or hanging quotations segment exists. If the closing parenthesis or quotation is not present in the first object portion 304 (thus making it "hanging"), a confidence interval may be associated with the cue to indicate a high likelihood of a continuation.

In some embodiments, the second cue 314 may include the last string of text (e.g., last sentence, last word, etc.) of the first object portion 304. The object attributes analyzer 156 may perform a grammar analysis of the last string of text. For example, if the last word of the first object portion 304 is the word "and," than this cue may be a good indication that the first object portion continues to the second object portion 306. In another example, the last string of text may be the last sentence of the first object portion, which may be grammatically analyzed to determine whether the sentence is a complete sentence, a fragment, etc., of which the resulting determination may assist in determining whether the first object portion 304 is continued by the second object portion 306. The object attributes analyzer 156 may also determine whether the cue 314 includes a trailing space (a blank space without text), such that the last line of text in the first object portion 304 does not continue to the right margin, which may indicate the end of a paragraph, and thus the first object portion is a compete object.

In some embodiments, an analysis of the first cue 308 and the second cue 314 may be used in combination to create a determination of whether the second object portion 306 is a continuation of the first object portion 304, such as by creating a combined confidence interval. In addition, other attributes of the first object portion 304 and the second object portion 306 may increase or decrease the likelihood or confidence interval as to whether a continuation exists. For example, the number of words, characters, lines of characters, or location of lines in the first object portion may assist in determining whether there is a continuation.

In an example, some document formats will not break a single line from a new paragraph which would normally begin on a first page and include the remaining lines of the paragraph on the second page, but instead the format may default to placing the new paragraph in its entirety on the second page. In such an instance, the first page may include a blank line at the bottom of the first page. Thus, the location of the last line of the first object portion 304 may indicate that no continuation exists if the last line of characters of the first object portion 304 is not located at the bottom of the page. The bottom of the page may be determined by OCR, such as by determining an average, median, or other statistical determination of the lowest line including characters in the document. Similarly, other related factors may be used either in combination with, or separate from the factors described above including the first cue 308 and the second cue 314.

In some embodiments, the content modules 124 may analyze non-standard paragraphs 316, such as paragraphs that wrap around an image 318, or have other non-standard characteristics, formatting, or the like. The presence of the non-standard paragraphs 316 may modify an analysis of the first cue 308 and/or the second cue 314 where the first cue or the second cue is included in a non-standard paragraph. For example, a non-standard paragraph may not include an indention, a normal bottom line constraint, or other attributes associated with standard paragraphs.

Figure 4:
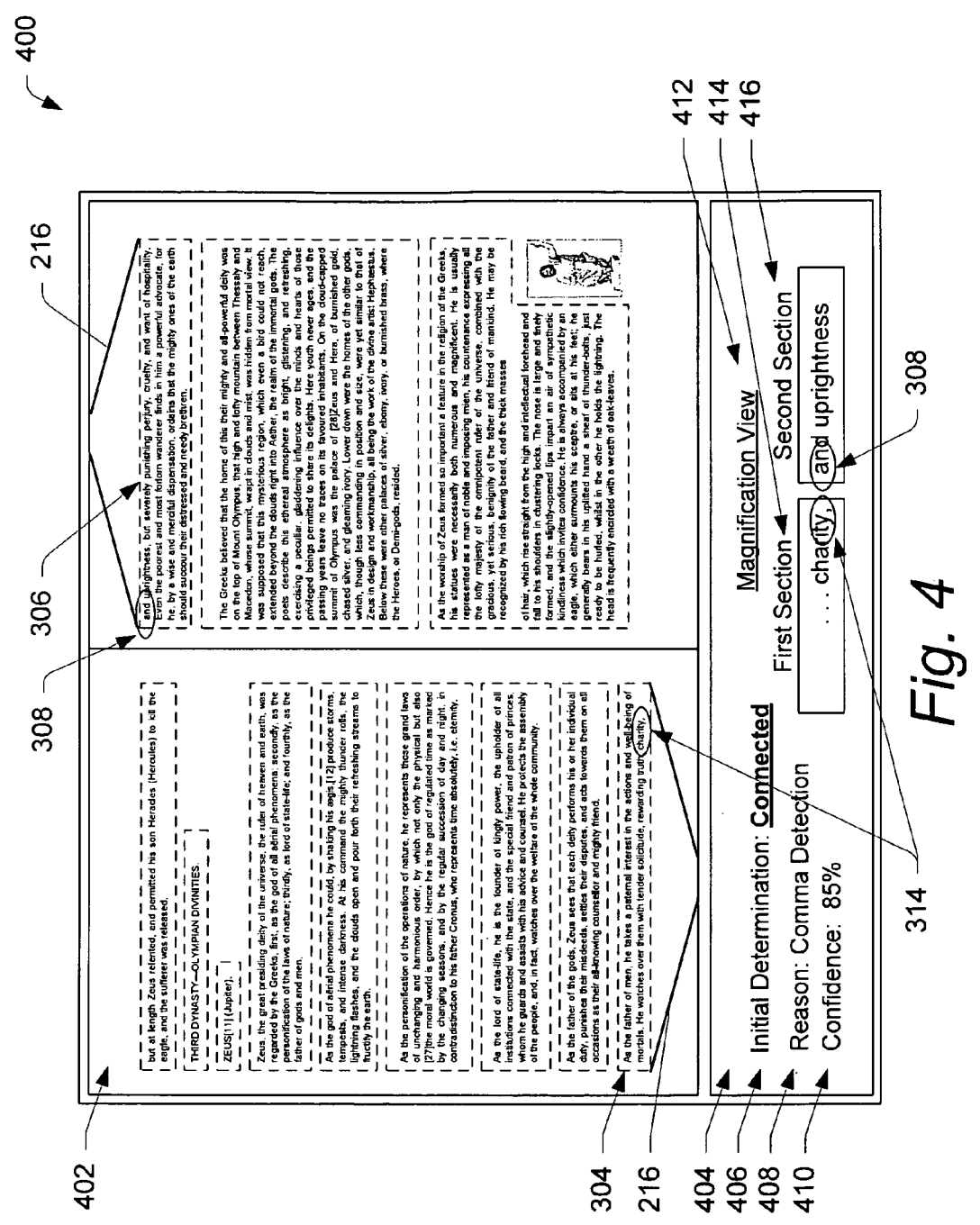

FIG. 4 shows an illustrative interface 400 for displaying pages in which content flows from one page to another and for providing information regarding the flow of content. The interface 400 may include a first section 402 for displaying the pages and a second section 404 for providing the information regarding the flow of content in the displayed pages to a user, such as the editor 108. As shown in the interface 400, the first portion 402 includes a visual guide 216. The visual guide 216 may indicate to the user that the initial determination 204 of content flow generated by the process 200 of FIG. 2 has determined a continuation is likely based on an analysis of the first cue 308, the second cue 314, and/or other factors analyzed by the content analysis module 146, such as factors analyzed by the object attributes analyzer 156 (e.g., number of words, characters, lines of characters, etc.).

The second section 404 may include an initial determination display 406, which may be generated by the initial determination module 160 and may be based on the initial determination 204 of FIG. 2. For example, the initial determination display 406 may include words, symbols, or other visual representations which indicate the result of an analysis by the initial determination module 160. As shown in FIG. 4, the initial determination display 406 may include words such as "connected," "continued," or other words recognizable to the editor 108. Alternatively, the initial determination display 406 may include words such as "not connected," "not continued," or the like. The initial determination display 406 may also include a null-value, such as when the initial determination module 160 does not provide an initial determination 204 and may instead defer to the editor 108 for a determination of the continuation status of an object. For example, in some instances, the content modules 124 may not be able to provide a determination based on an analysis of the first cue 308 and/or the second cue 314, such as when the information is ambiguous. Therefore, the initial determination display 406 may remain blank to indicate to the editor 108 that human interaction is necessary. In other embodiments, the initial determination module 160 may default to a particular initial determination such as connected regardless of the analysis of the first cue 308 and the second cue 314.

In some embodiments, the second section 404 may include a reason display 408 for the initial determination display 406. For example, the reason display 408 may include an occurrence or non-occurrence of an indention or capital letter in the first cue 308 or an occurrence or non-occurrence of punctuation or letters in the second cue 314, among other possible reasons. Multiple reason displays may be provided in some instances. Further embodiments may include a statistical confidence interval 410 for the initial determination display 406. For example, the statistical confidence interval 410 may be a percentage ranging from 0% to 100%, where a confidence interval of 100% is a definitive initial determination. A statistical confidence interval 410 of less than 100% may be used when an analysis by the content modules 124 of the first cue 308 and the second cue 314 results in ambiguous information, thus indicating to the editor 108 that further inspection is warranted.

In accordance with some embodiments, the second section 404 may include a magnification view 412. The magnification view 412 may assist the editor 108 in determining if the initial determination display 406 is a correct designation of whether content is continued from a one page to another. The magnification view 412 may include a magnification first section 414 that displays a portion of the first object 304, particularly the portion including the second cue 314. Similarly, the magnification view 412 may include a magnification second section 416 that displays a portion of the second object 306, particularly the portion including the first cue 308.

A document may include more than one continuation on a page. For example, a page may include an image which divides a first paragraph into a first object and a second object and may further include a second paragraph which is continued on a subsequent page. In some embodiments, the interface 400 may enable the editor to cycle through each paragraph continuation. Additionally or alternatively, the interface 400 may provide the initial determination display 406 and/or other information in the second section 404 for each of the paragraph continuations.

Figure 5:
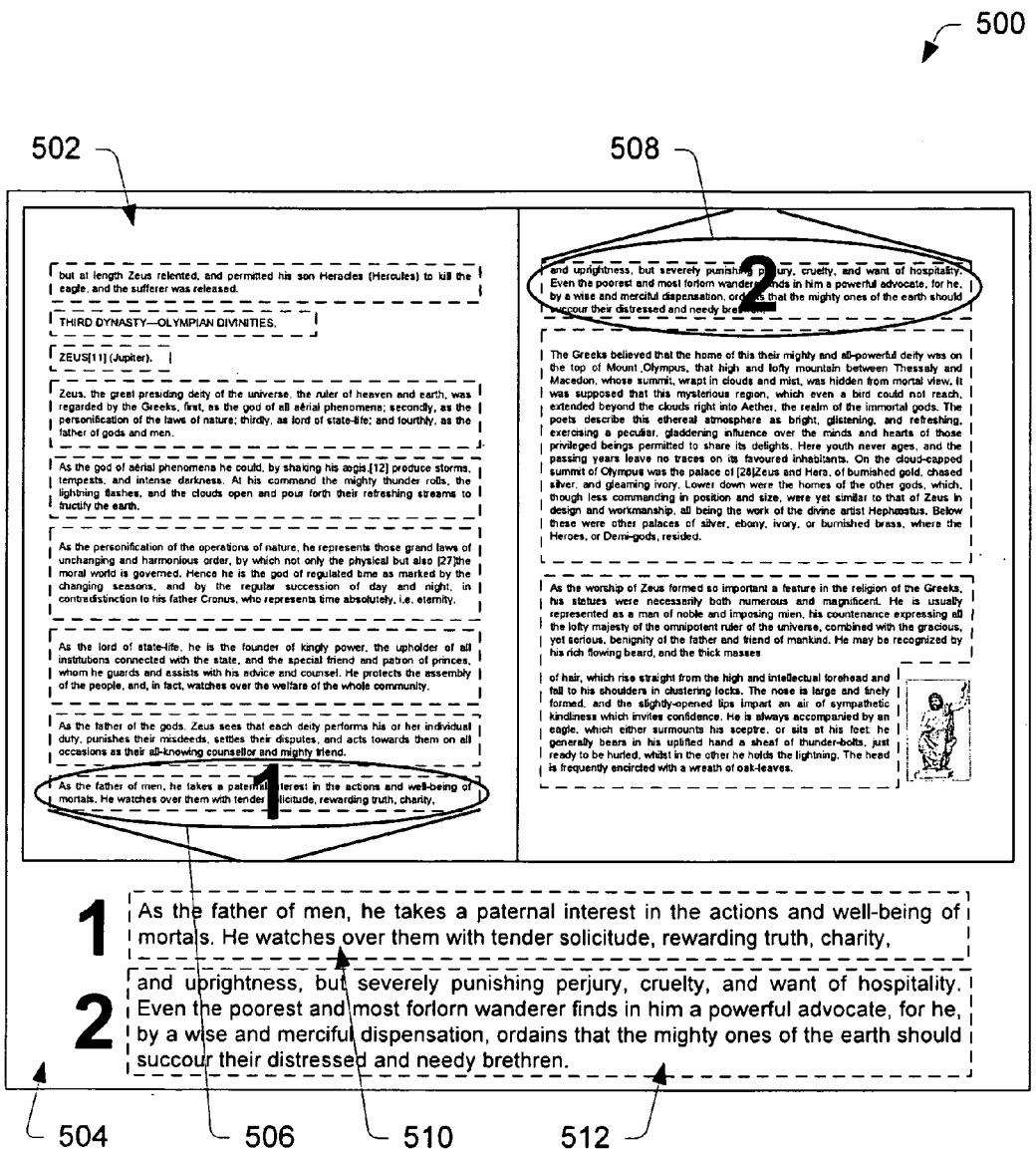
FIG. 5 shows an illustrative interface for displaying pages in which the flow of content continues from one page to another and for displaying objects for inspection by a user in accordance with some embodiments of the disclosure.

FIG. 5 shows an illustrative interface 500 for displaying pages in which the flow of content continues from one page to another and for displaying objects for inspection by a user in accordance with some embodiments of the disclosure. The interface 500 may include a first section 502 to display the pages of a document and a second section 504 to provide information regarding the flow of content in the pages for inspection by the editor 108. The first section may include a first visual indicator 506 and a second visual indicator 508, each associated with portions of objects that may include content that is continued from one another. The second section 504 may include a first display of content 510 of the portion of the object in the first visual indicator 506. Similarly, the second section 504 may include a second display of content 512 of the portion of the object in the second visual indicator 508. The first display of content 510 and the second display of content 512 may be arranged to enable the editor 108 to quickly determine if the objects include a continuation, such as by aligning the displays in a close proximity and in sequential order, although other arrangements may be used which assist an editor in identifying a continuation.

Figure 6:
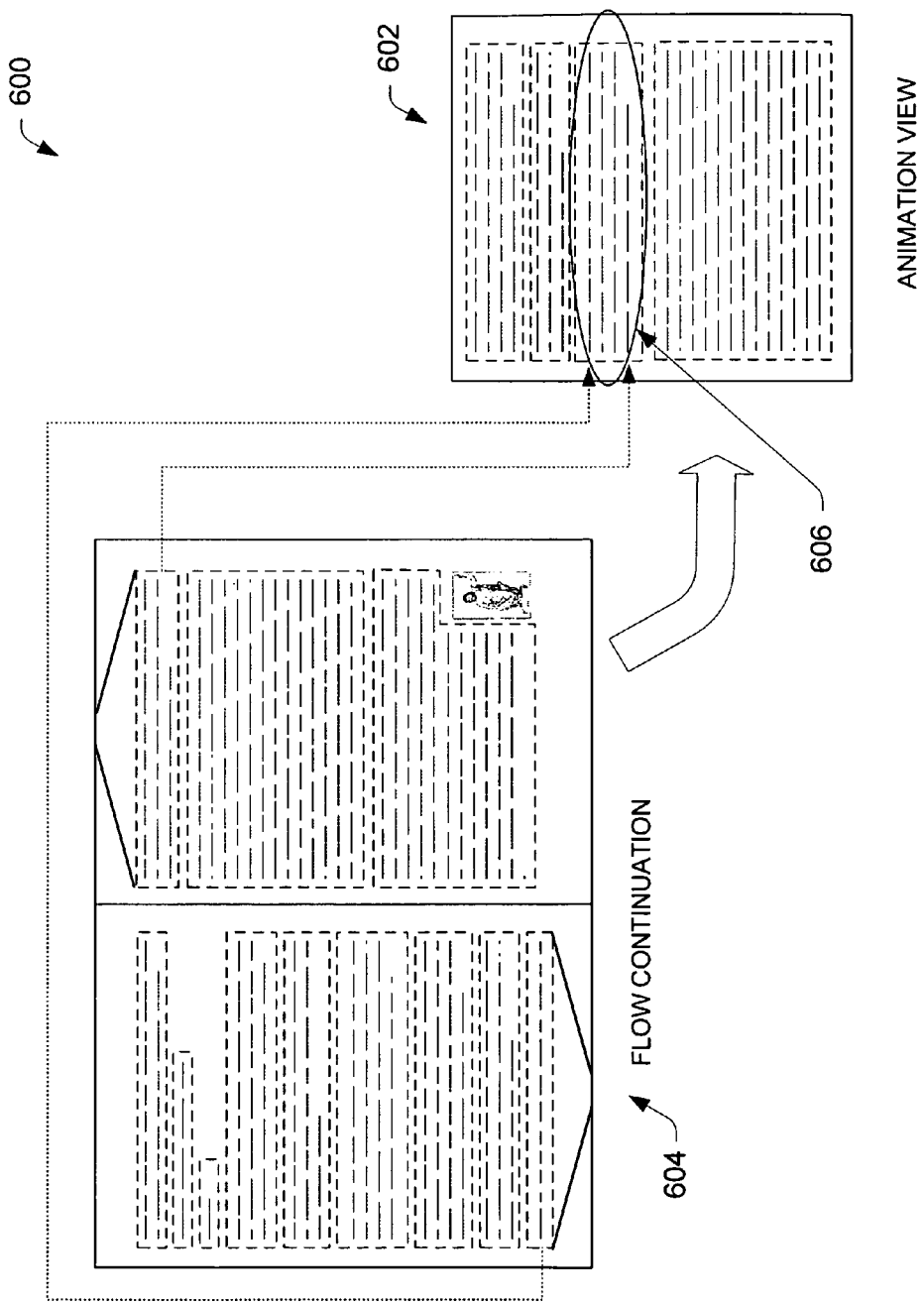
FIG. 6 shows an example of a visual representation of pages following a designation of a continuation of flow in accordance with one or more embodiments of the disclosure.

FIG. 6 shows an environment 600 illustrating a visual representation following a designation of a continuation of flow in accordance with one or more embodiments of the disclosure. A continuation status of objects may be used to merge the continued objects together to a single object in a second presentation, such as after the portions of the objects of content receive a continuation status. In some embodiments, the objects that are determined to have content continued from one page to another may move via animation from a separated location to a merged location by shifting the objects in accordance with the initial designation or editor designation. For example, after the editor 108 confirms the initial determination at 202 in FIG. 2, edits the initial determination at 212, or otherwise creates or modifies the initial determination using the process 200 of FIG. 2, the flow continuation server 102 may create an animation view 602 from an initial display 604 of a document to show the result of the editor's action or the result of the initial determination module 160. The animation view 602 may include the continued portions of objects arranged as a merged object 606, thus removing any intervening page break, column break, etc. in a presentation of the merged object. The merged object 606 may be visually presented to the editor 108 through the editing device 104, such as by using a graphical animation showing the two or more continued portions of objects merging into the merged object 606. In some embodiments, the animation view 602 may be displayed for a predetermined period of time. In additional embodiments, the animation view 602 may be automatically followed by a presentation of a new page for editing by the editor 108 if no action is taken after a second predetermined period. For example, if the editor does not confirm or reject the animation view 602, another page may be served by the flow continuation server 102 to the editing device 104.

In accordance with one or more embodiments, the flow continuation server 102 may provide user interfaces that maximize productivity of the editor 108 by minimizing input actions and mental thought processes of the editor 108. For example, the content modules 124 of the flow continuation server 102 may be intuitively understood by the editor such that little or no training is necessary for the editor to conduct his or her editing role. In addition, the commands necessary for the editor to interact with the flow continuation server 102 and/or the editing device 104 may be minimized to remove any time consuming action. For example, additional or unnecessary inputs (e.g., clicks on a mouse), menu selections, precise movements, or the like will require additional time for the editor 108 to manipulate objects of a page. When all of the pages of a large document must be edited, small reductions in time of the editing process per page may have significant benefits when measured over the duration of the editing of the document.

Figure 7:
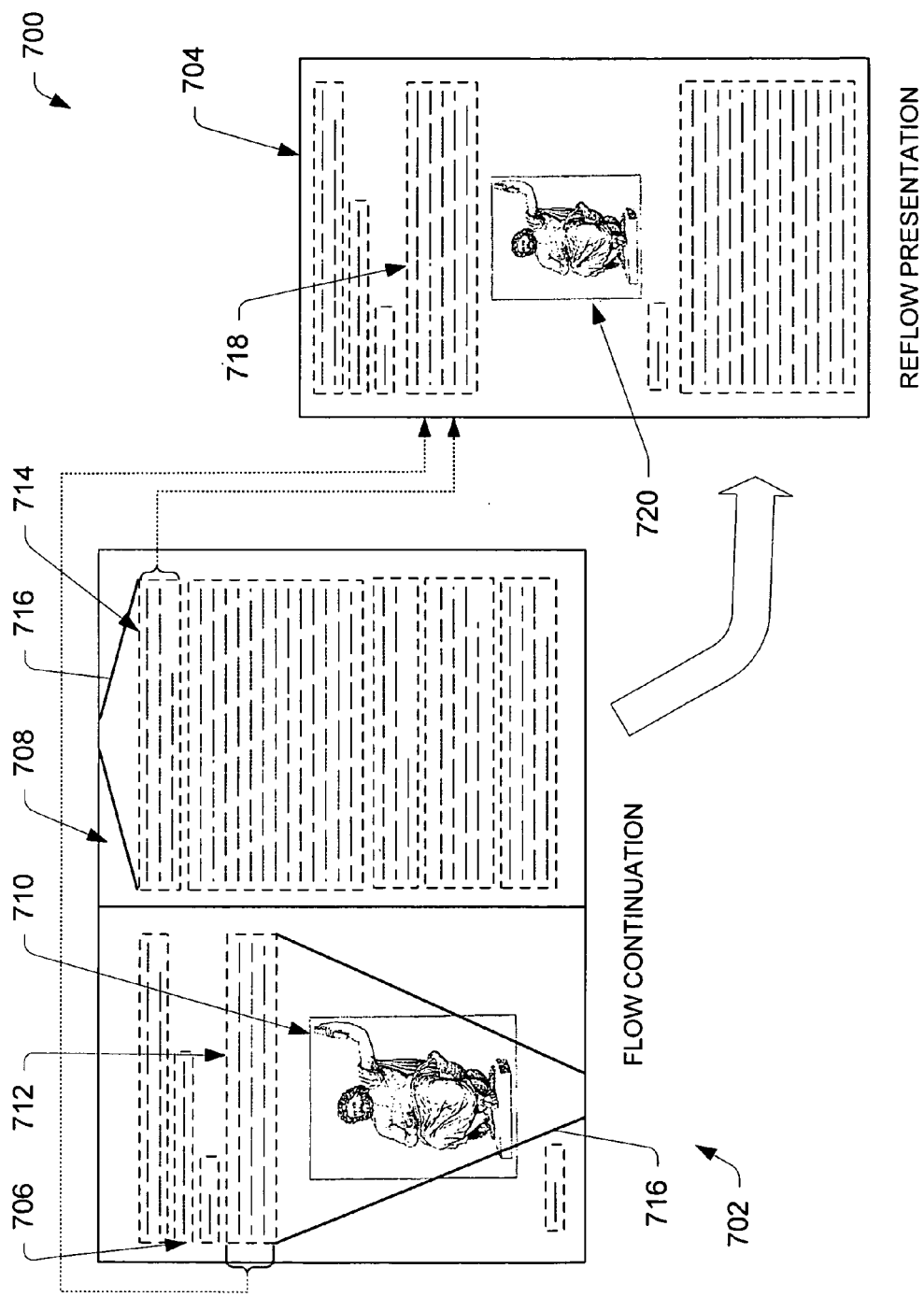
FIG. 7 shows an example of a visual representation of an initial display of pages and a reflow presentation of pages after a designation of a continuation status of an object in accordance with one or more embodiments of the disclosure.

FIG. 7 shows an environment 700 illustrating a visual representation of an initial display 702 and a resulting reflow presentation 704 after a designation of a continuation status of an object in accordance with one or more embodiments of the disclosure. The flow continuation 702 may be the image-based file 110 of FIG. 1A. The flow continuation 702 may include a header 706, body paragraphs 708, and an image 710, among other possible objects. As shown in the flow continuation 702, a first object 712 and a second object 714 are designated as being connected, which is indicated by a visual guide 716.

The reflow presentation 704 may be the reflowable image-based file 132 of FIG. 1A that is processed and/or displayed by the viewing device 134 for receipt by the user 136. As such, the reflowable image-based file 132 may include information as to whether content in portions of objects are continued from one page to another, as described herein. The reflowable presentation 704 may include the format of a display of the viewing device 134, such as an e-book, PDA, mobile telephone, portable computer, or other viewing device. The reflow presentation 704 may include presentation dimensions that are different than the flow continuation 702. For example, the reflow presentation 704 may have a longer and narrower presentation than the presentation of the flow continuation 702. Because of the variance of dimensions, the ordered objects of the flow continuation 702 may be displayed differently on the reflow presentation 704, while maintaining the continuation of flow of content in objects of a page. Thus, the first object portion 712 and the second object portion 714 may be combined into a merged object 718 on the reflow presentation 704. Other objects in the reflow presentation 704 may be presented accordingly, such as a modified image 720 which is positioned after the continued object 718, although other arrangements are possible.

Illustrative Operation

Figure 8:
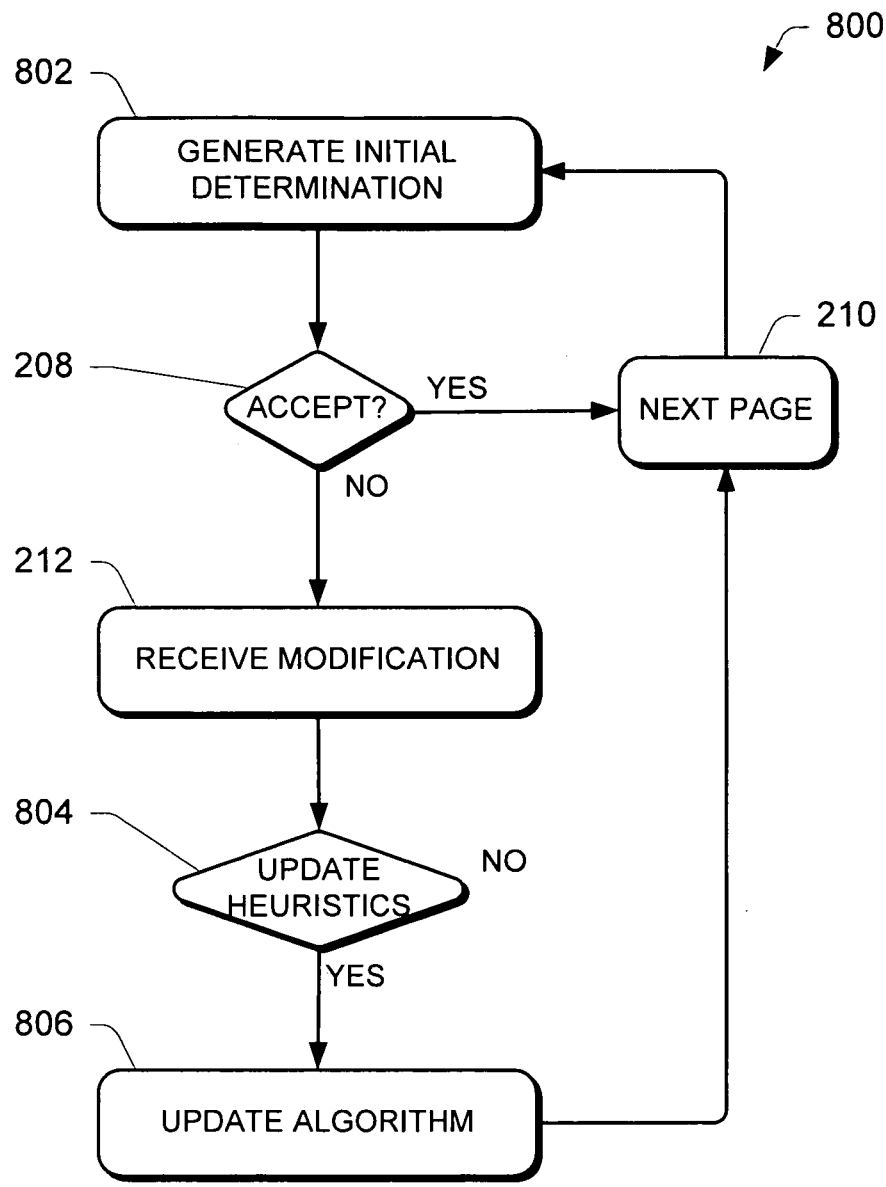
FIG. 8 is a flow diagram of an illustrative process of detecting a continuation of flow of content from one page to another using one or more of the modules of FIG. 1B.

FIG. 8 is a flow diagram of an illustrative process of detecting a continuation of flow of content from one page to another using one or more of the modules of FIG. 1B. Many of the operations in the process 800 are similar to those in the process 200 described with reference to FIG. 2. Therefore, similar or identical operations of FIG. 8 will not be discussed in detail.

In accordance with embodiments, at 802, a flow continuation initial determination may be created by the initial determination module 160. In some embodiments, the initial determination may include updated heuristics which may be generated by the update algorithm module 164 by analyzing input from the editor 108.

Continuing through the process 800, at 804, an update heuristics decision may be implemented after an editor designation is received by the flow continuation server 102. The update heuristics decision may proceed to updating the algorithm at 806 if a criterion is satisfied. For example, the criterion may include a predetermined threshold number of inputs by the editor 108 to create heuristic data. In some embodiments, the heuristics data may enable advanced heuristics to update the continuation algorithm 162 used by the initial determination module 160 based on the editor input to create a more accurate initial determination. At 806, the update algorithm module 164 may analyze the heuristics data to update the initial determination for increasing a statistical confidence interval, among other reasons, thus potentially resulting in an increase in acceptance (the operation 206) of the initial determination at 802. In some embodiments, the update algorithm module 164 may make an initial determination dispositive, which may not result in action by the editor 108, such as when the update algorithm module 164 determines a particular cue is dispositive of a continuation status of an object. For example, if a cue creates an initial determination at 802 that is not modified by the editor 108 for a predetermined threshold of consecutive occurrences, the update algorithm module 164 may designate the cue as being dispositive, which may include a statistical confidence interval of 100%.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A computer-implemented method comprising:
as implemented by one or more computing devices configured with specific executable instructions,
generating a first determination of a first continuation status of text in a first text group on a first page of a document that is separated from a second text group on a second page of the document, the first determination being based at least in part on a contextual cue within the document associated with at least one of the first text group or the second text group, wherein the first continuation status indicates that the second text group is a continuation of the first text group;
visually representing the first determination to indicate the first continuation status;
receiving an indication to confirm the first determination;
generating continuation data, based at least in part on the received indication, wherein the continuation data indicates that the first text group and the second text group are connected;
generating a reflowable image-based file including the first text group, the second text group, and the continuation data; and
applying the continuation data from the reflowable image-based file to the first text group and the second text group from the reflowable image-based file to cause presentation of the reflowable image-based file with the first text group and the second text group presented as connected.

2. The computer-implemented method as recited in claim 1, wherein generating the first determination includes analyzing the contextual cue, the contextual cue being at least one of an indention of text, a punctuation mark, a capitalization status of text, a trailing space, or a string of text for a grammar analysis.

3. The compute implemented method as recited in claim 1, further corn rising:
identifying a second contextual cue within the document associated with at least one of a third text group or a fourth to roue within the document; and
generating a second determination that the fourth text group is not a continuation of the third text group, wherein the second contextual cue indicates the occurrence of an indention of text in the fourth text group.

4. The computer-implemented method as recited in claim 1, wherein visually representing the first determination includes generating a magnification of the first text group and the second text group, and wherein visually representing the first determination further includes generating a visual indicator showing the first text group and the second text group as connected to one another.

5. The computer-implemented method as recited in claim 1 further comprising:
generating a visual animation showing the first text group and the second text group designated as connected to one another.

6. A computer-implemented method of determining whether an object is a continuation of another object, the method comprising:
as implemented by one or more computing devices configured with specific executable instructions,
locating a portion of a first object on a page of a document, the portion of the first object having an area designated as a contextual cue, wherein the locating the portion of the first object includes selecting the portion of the object at a page break
analyzing the contextual cue to determine a first continuation status of the portion of the first object, wherein the continuation status is an indication that the first object is a continuation of a second object;
visually representing the first continuation status;
receiving an indication to confirm the continuation status;
generating continuation data, wherein the continuation data indicates that the first object and the second object are connected;
generating a reflowable image-based file including first object, the second object, and the continuation data; and
applying the continuation data from the reflowable image-based file to the first object and the second object from the reflowable image-based file to cause presentation of the reflowable image-based file with the first object and the second object presented as connected.

7. The computer-implemented method as recited in claim 6, wherein the area designated as the contextual cue is a lower right portion of the first object or an upper left portion of the first object.

8. The computer-implemented method as recited in claim 6, wherein analyzing the contextual cue includes using optical character recognition (OCR) to determine whether the contextual cue includes an indention, and wherein the portion of the first object is designated as not having content on another page of the document when the indention is identified in the contextual cue.

9. The computer-implemented method as recited in claim 8, further comprising determining whether indentions are included in other objects on a page of the document, and when indentions are included in the other objects, the portion of the first object is designated as dispositively not being a continuation when the indention is identified in the contextual cue.

10. The computer-implemented method as recited in claim 9, wherein determining whether indentions are included in the other objects further includes a random selection of the other objects to determine whether indentions are included in the other objects such that a predetermined threshold is reached to indicate the other objects include indentions.

11. The computer-implemented method as recited in claim 6, wherein analyzing the contextual cue includes determining whether the contextual cue includes a punctuation mark.

12. The computer-implemented method as recited in claim 11, wherein analyzing the contextual cue further includes;
assigning a first likelihood for the first continuation status as not a continuation when the punctuation mark comprises a period, a question mark, or an exclamation point, and
assigning a second likelihood for the first continuation status as a continuation when the punctuation mark comprises a comma, a semicolon, a colon, or a hyphen.

13. A computer-implemented method comprising:
as implemented by one or more computing devices configured with specific executable instructions,
generating a first continuation status, wherein the first continuation status is an indication of whether a second object portion on a second page of a document is a continuation of a first object portion on a first page of the document;
making the first continuation status available to an editing computing device;
receiving an indication to cancel the first continuation status;
generating continuation data, wherein the continuation data indicates that the first object portion and the second object portion are not connected;
generating a reflowable image-based file including the first object portion, the second object portion, and the continuation data; and
applying the continuation data from the reflowable image-based file to the first object portion and the second object portion from the reflowable image-based file to cause presentation of the reflowable image-based file with the first object portion and the second object portion presented as not connected.

14. The computer-implemented method as recited in claim 13, wherein generating the first continuation status includes analyzing a contextual cue, the contextual cue being an area of the first object portion or the second object portion.

15. The computer-implemented method as recited in claim 14, wherein the second object portion is not a continuation of the first object portion when the contextual cue of the second object portion includes a presence of an indention.

16. The computer-implemented method as recited in claim 14, wherein the second object portion is a continuation of the first object portion when the contextual cue of the first object portion includes a presence of a comma, a semicolon, a colon, or a hyphen.

17. The computer-implemented method as recited in claim 13, further comprising causing display of a magnification of a lower right corner of the first object portion and an upper left corner of the second object portion.

18. A system comprising:
a processor; and
memory storing modules executable by the processor, the modules comprising:
a cue locator module that locates a contextual cue associated with a portion of a first object, wherein the contextual cue and the portion of the first object are on a bottom of a page of a document;
a cue analyzer module that identifies the contextual cue;
an initial determination module that generates a first continuation status for the portion of the first object based at least in part on the identification of the contextual cue, wherein the first continuation status is an indication of whether the portion of the first object is a continuation of another portion of the first object;
a representation module that:
visually represents the first continuation status, and
receives an indication to confirm the first continuation status; and
a reflow module that:
generates continuation data, wherein the continuation data indicates that the portion of the first object is connected to the another portion of the first object;
generates a reflowable image-based file including the portion of the first object, the another portion of the first object, and the continuation data; and
apply the continuation data from the reflowable image-based file to the portion of the first object and the another portion of the first object from the reflowable image-based file to cause presentation of the reflowable image-based file with the portion of the first object and the another portion of the first object as connected.

19. The system as recited in claim 18,
the modules further comprising a punctuation analyzer module to increase a likelihood associated with a designation of the portion of the first object as not being continued on another page upon identification of the contextual cue being a period, question mark, or exclamation point, and to increase the likelihood associated with a designation of the portion of the first object as being continued on the another page upon identification of the contextual cue being a comma, a semicolon, a colon, or a hyphen.

20. The system as recited in claim 18, wherein the cue locator module further locates another contextual cue associated With the another portion of the first object, wherein the another contextual cue and the another portion of the first object are on a top of another page, the modules further comprising a capitalization analyzer module to identify a capitalization of text in the another cue to increase a likelihood associated with a designation of the another portion of the first object as not being continued on the page and to identify a lower-case text in the another contextual cue to increase the likelihood associated with the designation of the another portion of the first object as being continued on the page.

21. A non-transitory computer-readable medium having a computer-executable component, the computer-executable component comprising a user interface component operative to:
cause a first page of a document to be displayed, the first page having:
a first part including a target object at the top of the first page or the bottom of the first page, the target object having a first continuation status, wherein the first continuation status is an indication of whether the target object is continued on another page; and
a second part having a first determination of the first continuation status of the target object of the first page;
receive an indication to confirm the first determination;
generate continuation data, wherein the continuation data indicates that the target object is continued on the another page;
generate a reflowable image-based file including the target object and the continuation data; and
apply the continuation data from the reflowable image-based file to the target object from the reflowable image-based file to cause presentation of the reflowable image-based file with the target object on a single page.

22. The non-transitory computer-readable medium as recited in claim 21, wherein the second part includes a magnification of a lower right portion of the target object when the target object is at the bottom of the first part of the page and an upper left portion of a subsequent object.

23. The non-transitory computer-readable medium as recited in claim 21, wherein the second part includes a message associated with the first determination, the message indicating a reason upon which the first determination is made.

24. The non-transitory computer-readable medium as recited in claim 21, wherein the first part includes a visual indicator when the target object is determined to continue from the page to another page.

* * * * *